Nov. 19, 1968
G. R. RILEY ET AL
3,411,687
EXPLOSIVE TUBE WELDING TOOL
Filed March 7, 1967
3 Sheets-Sheet 1
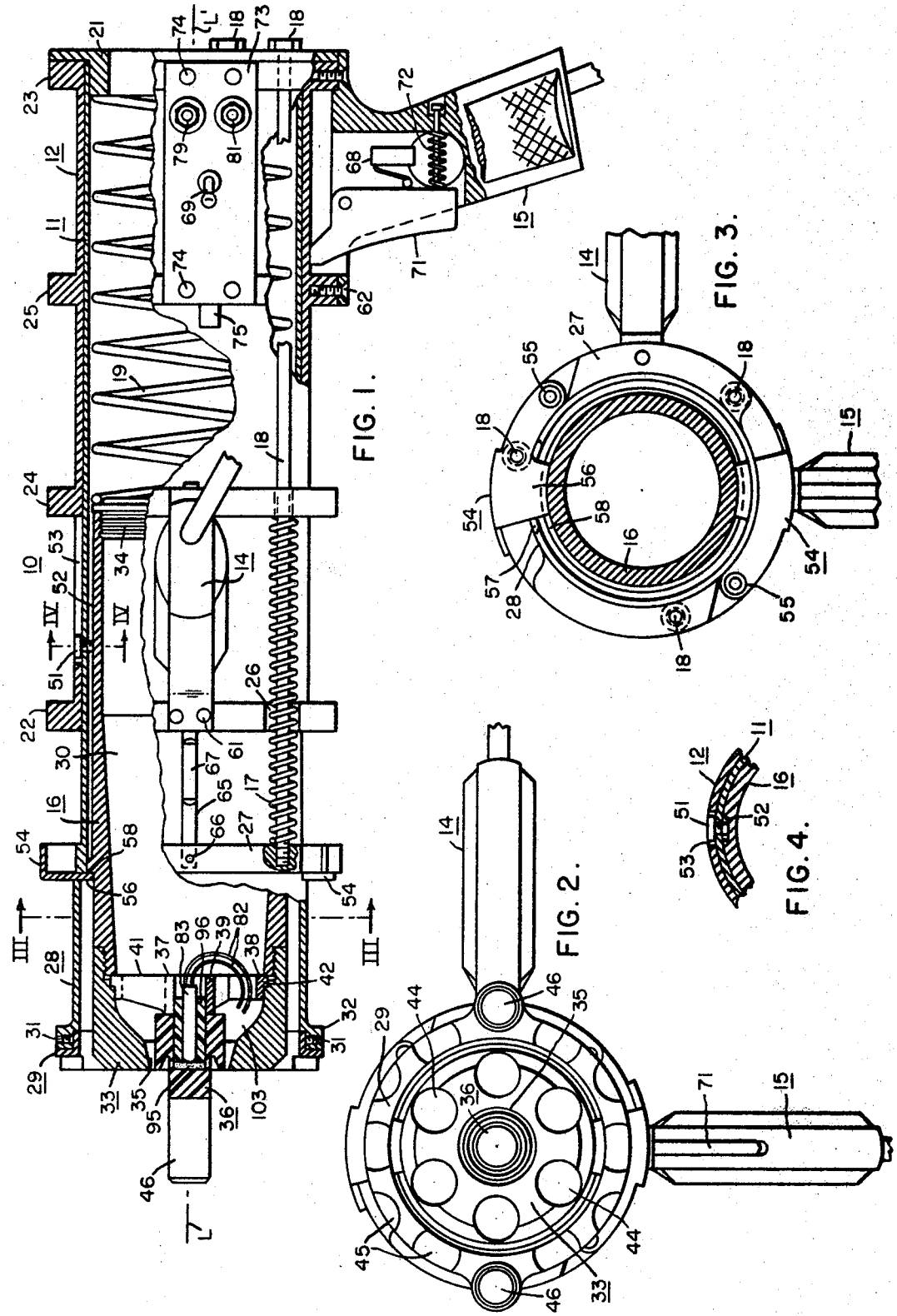

Nov. 19, 1968  G. R. RILEY ET AL  3,411,687
EXPLOSIVE TUBE WELDING TOOL
Filed March 7, 1967  3 Sheets-Sheet 2

United States Patent Office 3,411,687
Patented Nov. 19, 1968

3,411,687
EXPLOSIVE TUBE WELDING TOOL
George R. Riley, Grove City, and Robert H. Wittman and Ronald L. Legue, Columbus, Ohio, assignors to Westinghouse Electric Corporation, Pittsburgh, Pa., a corporation of Pennsylvania
Filed Mar. 7, 1967, Ser. No. 621,323
14 Claims. (Cl. 228—3)

ABSTRACT OF THE DISCLOSURE

A manually held explosive welding tool includes a cylinder slidably mounted on a piston sleeve containing a hollow piston. Reaction force springs are preloaded by the operator upon moving the cylinder to compress the springs before the explosive charge can be fired. The piston head is biased against the surface of a workpiece by a recoil spring. The explosion gases expand into the hollow piston which is driven to compress the recoil spring, thereby absorbing the recoil energy.

---

This invention relates, generally, to explosive welding and, more particularly, to manually held tools for performing exposive welding.

Explosive welding may be defined as a solid-state welding process wherein coalescence is produced by the application of pressure by means of an explosion.

A method of welding a tube to a mating bore of a plate member or tube sheet by detonation of a high explosive charge disposed concentrically with the tube is disclosed in a patent application, Ser. No. 467,244, filed June 28, 1965, by C. C. Simons and R. J. Carlson, and assigned by mesne assignment to the Westinghouse Electric Corporation. As explained in the aforesaid application, the placement of the explosive charge in the tube is important, and preferably a disc-shaped charge of PETN, for example, is embedded in a suitable plastic material and is located in a predetermined position with relation to the surface of the plate member in order to obtain a satisfactory explosively welded joint between the outer wall of the tube and the wall defining the bore. When the welding process is performed with a handheld tool, it is necessary to make certain that the tool is being held in the proper position before the explosive charge can be fired and to provide for absorbing the recoil energy of the explosion to insure that the tool remain stationary.

Accordingly, an object of this invention is to provide a manually held explosive welding tool having a simple and effective device for absorbing recoil energy.

Another object of the invention is to provide for positive control of the location of the explosive charge with respect to the tubes and tube sheet when tubes are being welded to a tube sheet as, for example, in the manufacture of heat exchangers.

A further object of the invention is to provide an explosive welding tool which can be utilized with tube sheets which have been pretubed.

Still another object of the invention is to provide a tool which can be utilized with tube sheets having the tubes arranged in different patterns.

A still further object of the invention is to protect the tubes adjacent to the tube being welded from damage from explosive products and cartridge debris.

Other objects of the invention will be explained fully hereinafter or will be apparent to those skilled in the art.

In accordance with one embodiment of this invention, a manually held explosive welding tool includes reaction force spring means which must be preloaded by the operator pressing on handles on a cylinder slidably mounted on a piston sleeve before the explosive charge can be fired. The charge is disposed in an expendable holder positioned in the head of a hollow piston biased against the face of the tube sheet by a recoil spring disposed inside the piston sleeve. The explosion gases expand into the hollow piston which is closed at the end opposite the head and is driven to compress the recoil spring, thereby absorbing the recoil energy. The tool is positioned on the tube sheet by tube guides which are carried by the piston sleeve and cooperate with tubes adjacent the tube being welded.

For a better understanding of the nature and objects of the invention, reference may be had to the following detailed description, taken in conjunction with the accompanying drawings, in which:

FIGURE 1 is a longitudinal view, partly in plan and partly in section, of a manually held explosive welding tool embodying principal features of the invention;

FIG. 2 is a view, in end elevation, of the tool shown in FIG. 1;

FIG. 3 is a cross-sectional view taken along the line III—III in FIG. 1;

FIG. 4 is a detail view, in section, taken along the line IV—IV in FIG. 1;

Figure 5:
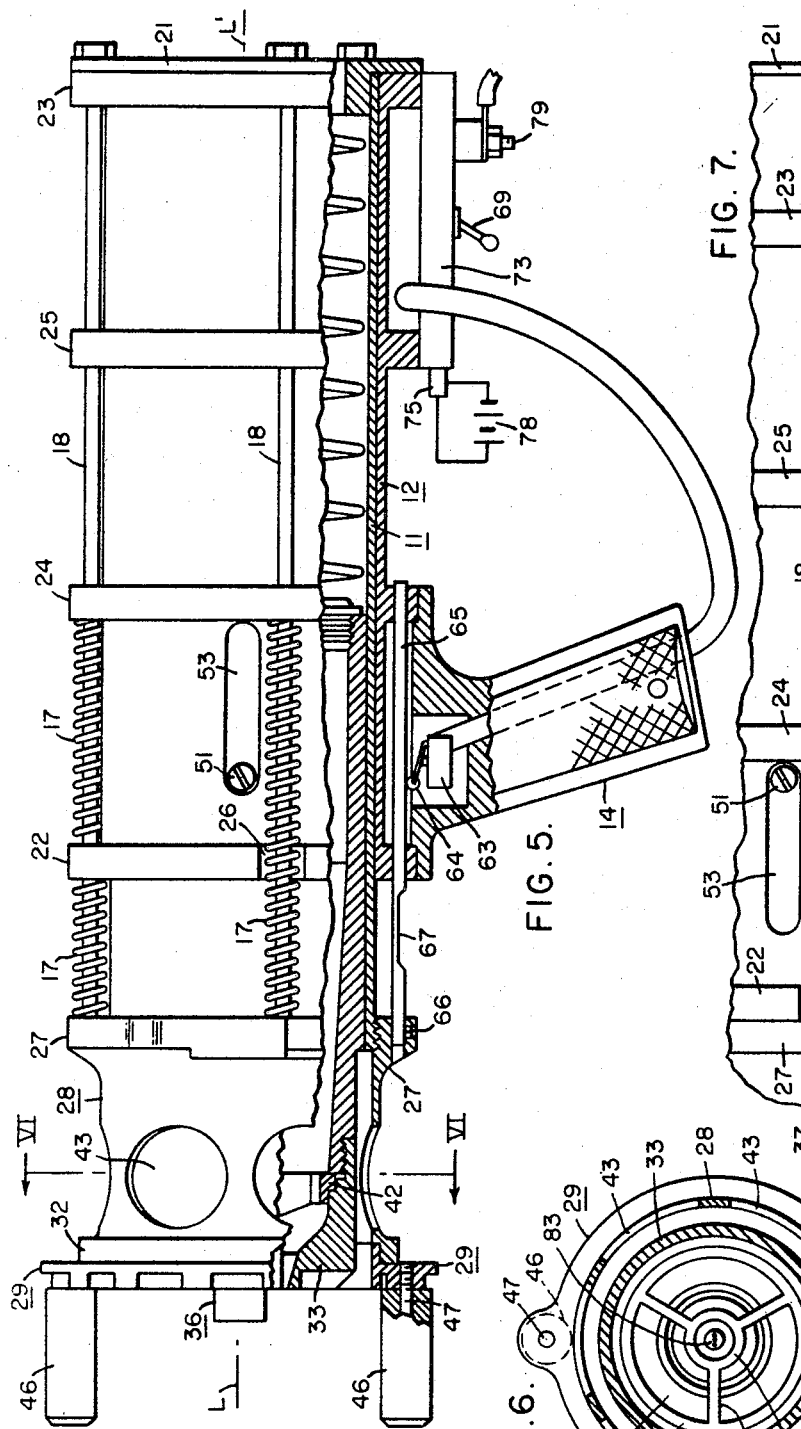
FIG. 5 is a longitudinal view, partly in elevation and partly in section, of the tool.

Referring to the drawings, and particularly to FIGS. 1 and 5, a welding tool 10 shown therein comprises a cylindrical piston sleeve 11 having a longitudinal axis L-L′, a reaction force cylinder 12 slidably mounted on the sleeve 11 and movable along the axis L-L′, handles 14 and 15 on the cylinder 12, a hollow piston 16 slidably disposed inside the sleeve 11 and movable along the axis L-L′, reaction force springs 17 compressibly mounted on guide rods 18, and a recoil spring 19 disposed inside the sleeve 11 between a closed end of the piston 16 and a flanged retaining ring 21 in one end of the sleeve 11. The cylinder 12 has annular end flanges 22 and 23 and intermediate annular flanges 24 and 25 formed integrally therewith. The end flange 22 has notches 26 therein for receiving the spring 17 and the guide rods 18. The rods 18 pass through holes in the flanges 23, 24 and 25 and are threaded into a flange 27 on a hollow tubular base 28 which is threaded onto the end of the sleeve 11 opposite the retaining ring 21. The ring 21 is retained in the sleeve 11 by the guide rods 18. An annular flanged tube sheet adaptor 29 is retained on the end of the hollow base 28 opposite the end which is attached to the sleeve 11. The adaptor 29 may be retained by set screws 31 which extend through an annular flange 32 on the base 28.

A piston head 33 is threaded onto the open end of the hollow piston 16 opposite the end which is closed by a threaded plug 34, thereby forming a chamber 30 inside the piston. The piston head 33 has a centrally disposed round opening 35 therein for receiving an explosive charge holder 36. The holder 36 is supported by a spider 37 which is disposed inside the head 33 and is retained in position at the end of the hollow piston 16 by the head 33.

Figure 6:
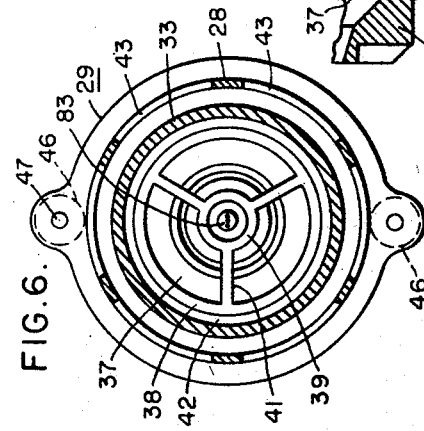
FIG. 6 is a cross-sectional view taken along the line VI—VI in FIG. 5.

As shown more clearly in FIG. 6, the spider 37 comprises an outer ring portion 38 and an inner ring portion 39 which are joined by three arms 41 spaced 120° apart. The inner ring portion 39 is concentric with the longitudinal axis L-L′ and support the charge holder 36, and the outer ring portion 38 has a flange 42 thereon which is engaged by the piston head 33 to retain the spider in position. The hollow base 28 has a plurality of exhaust ports 43 spaced around its wall as shown in FIGS. 5 and 6.

Figure 8:
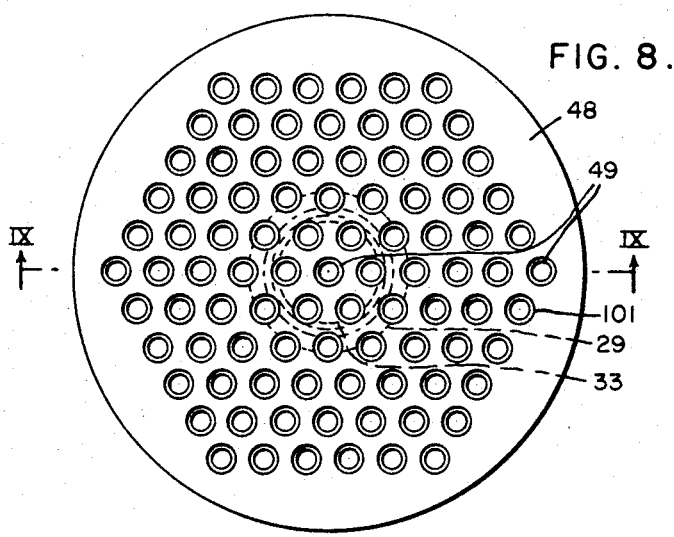
FIG. 8 is an end view of a heat exchanger tube sheet.
Figure 9:
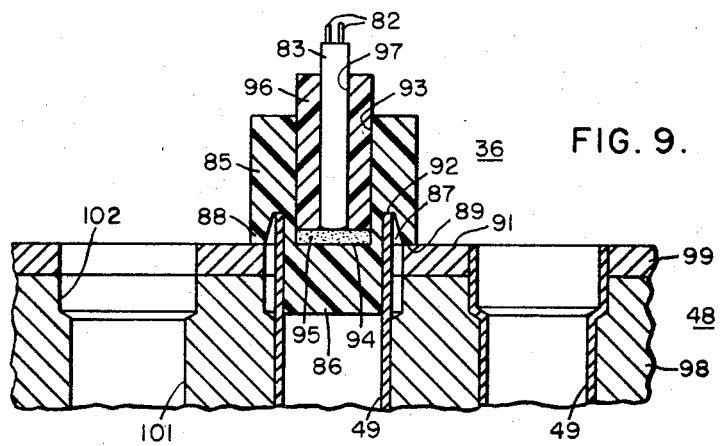
FIG. 9 is an enlarged fragmentary sectional view, taken along line IX—IX in FIG. 8, illustrating steps in the welding process.

In order to permit the tool 10 to be used with a tube sheet 48 having tubes 49 arranged in the manner shown in FIG. 8, with the ends of the tubes preliminarily extending above the sheet as shown in FIG. 9, the piston head 33 has an annular array of recesses 44 spaced equally in its outer face around the opening 35 as shown in FIG. 2. The recesses 44 are effective to receive the ends of tubes 49 adjacent the tube being welded, thereby permitting the tool to be utilized with pre-tubed tube sheets, that is tube sheets having all or most of the tubes placed in the sheet before the welding operation is started. Likewise, the tube sheet adaptor 29 has a plurality of recesses 45 in its outer face for receiving the ends of tubes 49 installed in the tube sheet.

In FIG. 8 the tubes 49 are arranged in a geometric pattern having a trianguler pitch. Other adaptors may be provided having the recesses 45 arranged for utilization with tube sheets having the tubes arranged in different geometric patterns. Likewise, other piston heads 33 having the recesses 44 arranged in a different manner may be provided for utilization with different tube patterns.

The locations of tube sheet adaptor 29 and the piston head 33 on the tube sheet 48 is shown by the broken lines in FIG. 8 which indicate the outlines of the adaptor 29 and the head 33. As shown, the welding tool is in position to weld the center tube 49. In order to properly locate the tool 10 on the tube sheet, two diametrically opposite tube guide members 46 are attached to the tube sheet adaptor 29 by bolts 47. The tube guides 46 are inserted into tubes 49 in the tube sheet 48 during the welding operation.

In order to permit longitudinal movement of the piston 16 along the axis L–L′ but prevent rotation of the piston in the sleeve 11, a screw 51 is threaded through the sleeve 11 into a groove 52 in the side of the piston 16 (see FIGS. 1 and 4). A slot 53 is provided in the cylinder 12 for the head of the screw 51 to permit the cylinder to slide on the sleeve 11. In this manner, proper alignment of the recesses 44 in the piston head 33 with the guide members 46 is assured.

The piston 16 is retained in the sleeve 11 by two latches 54. As shown more clearly in FIG. 3, each one of the latches 54 is pivotally mounted on the flange 27 of the base 28 by a screw 55 and has a projection 56 which extends through a slot 57 in the base 28 to engage a shoulder 58 on the piston 16. The latches 54 may be swung outwardly about the pivot point 55 to permit the piston 16 to be removed through the base 28 for servicing.

As shown in FIGS. 1 and 5, the handle 14 spans the flanges 22 and 24 on the cylinder 12 and is attached to the flanges by screws 61. Likewise, the handle 15 spans the flanges 23 and 25 and is attached to the flanges by screws 62. If desired, a plurality of holes may be provided in the flanges to permit the handles to be located at positions most suitable to the operator.

Figure 7:
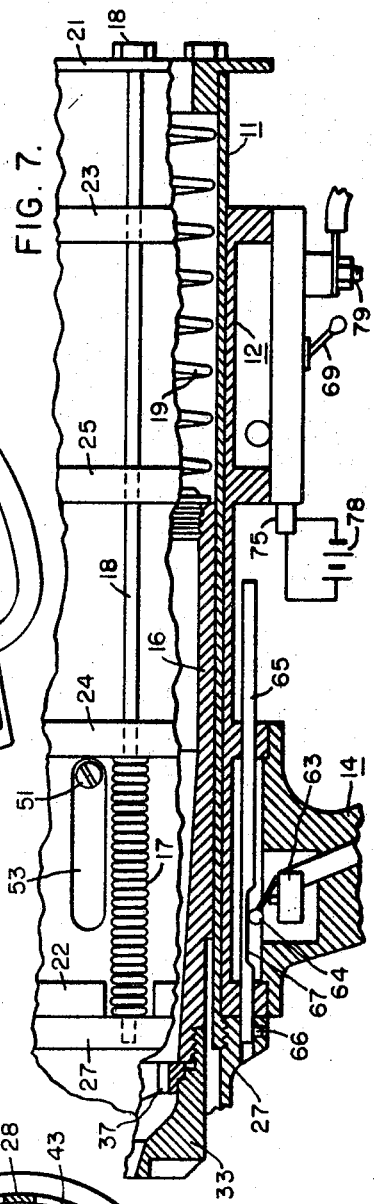
FIG. 7 is a view, similar to FIG. 5, but showing parts of the tool in the explosive charge firing position.

In order to assure that the reaction force springs 17 are preloaded with a predetermined force before the explosive charge 36 can be fired, a switch 63 is located in the handle 14. The switch 63 is actuated by a roller arm 64 which engages a cam 65, which is secured in the flange 27 by a set screw 66, and extends through the flanges 22 and 24 on the sleeve 12. The cam 65 has a recessed portion 67 which permits the switch 63 to be closed when the flange 22 is moved into engagement with the flange 27 to compress the springs 17 as shown in FIG. 7. The springs 17 are compressed between the flanges 27 and 24. Since the switch 63 is inside the handle 14, the switch can only be closed by moving the cylinder 12 to the position shown in FIG. 7, thereby compressing the springs 17.

Figure 10:
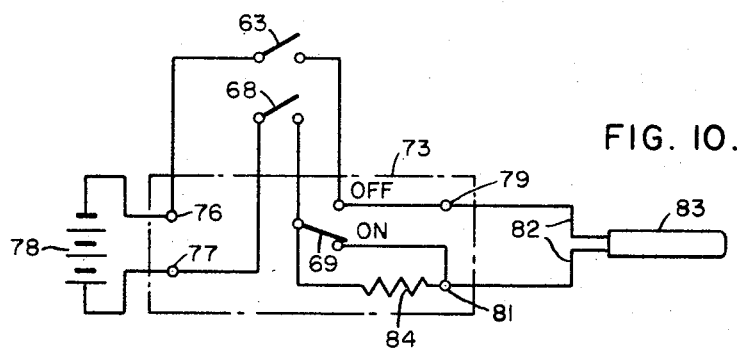
FIG. 10 is a diagrammatic view showing circuit connections for the welding tool.

As shown in FIG. 10, the switch 63 is connected in series-circuit relation with a switch 68 an a switch 69. The switch 68 is located in the handle 15 and is actuated by a trigger 71 pivotally mounted on the handle 15, as best seen in FIG. 1. The trigger 71 is biased outwardly by a spring 72. The switch 69 is mounted on a terminal block 73 which spans the flanges 23 and 25 (see FIG. 1) and is attached to the flanges by screws 74. A receptacle 75 having terminals 76 and 77, as shown in FIG. 10, is mounted on the terminal block 73. Connections from a battery 78 may be attached to the terminals 76 and 77. Terminals 79 and 81 are also mounted on the terminal block 73. The terminals 79 and 81 may be utilized for attaching conductors 82 which are attached to a detonator 83. In the "off" position of the switch 69, a resistor 84 is connected across the terminals 79 and 81 to drain off stray electrical charges, thereby preventing firing from stray radio-frequency-induced current.

During preparation for use, such as loading and wiring of the detonator, the switch 69 is positioned in the "off" position. When the switch 69 is in the "on" position, the register 84 is shunted from the circuit. Since the switches 63, 68 and 69 are connected in series-circuit relation, all three switches must be closed to connect the detonator 83 to the battery 78 to fire the detonator.

The charge holder 36 is preferably of the type disclosed in a patent application, Ser. No. 488,670, filed Sept. 20, 1965 by R. J. Carlson, Charles C. Simons and R. L. Bradford and assigned by mesne assignment to the Westinghouse Electric Corporation. The holder 36 is composed of a plastic material and is expendable. As shown in FIG. 9, it comprises a body member 85 having a longitudinal central axis and a cylindrical portion 86 which is of a smaller diameter than the body portion 85. The cylindrical portion 86 has a diameter slightly smaller than the inside diameter of the tube 49. The body member 85 has an annular recess or groove 87 defining the inner periphery of an axially extending skirt portion 88 and coaxially aligned with the cylindrical portion 86. The skirt portion 88 has an end face 89 which engages the face 91 of the tube sheet 48. The end of the tube 49 extends above the face 91 into the groove 87 and engages the end face 92 of the groove 87. The body member 85 has a central axially extending open-ended cavity 93 of circular cross-section and having a bottom wall 94 lying in substantially the same plane as the end face 89 of the skirt 88. An explosive charge 95 is disposed at the bottom of the cavity 93. As explained hereinbefore, the charge 95 may be composed of any suitable explosive material of sufficient detonation velocity to effect explosive welding.

The charge 95 is disc-shaped and is retained in the cavity 93 by a tubular sleeve 96 which is pressed into the cavity, or otherwise held therein. The sleeve 96 has a central axially extending bore 97 for receiving the detonator 83. As shown in FIG. 1, the sleeve 96 extends into the ring 39 of the spider 37 when the charge holder 36 is in position in the piston head 33.

As shown in FIG. 9, the tube sheet 48 may be of a clad construction having a major plate portion 98 composed of one metal and a relatively thin clad portion 99 composed of a different metal and bonded to each other. As shown in FIG. 8, the sheet 48 has a large number of bores 101 therein arranged in a closely spaced geometric pattern. As shown in FIG. 9, each bore 101 has an enlarged portion 102 which extends below the clad portion 99 of the sheet. As previously explained, each tube 49 extends above the face 91 of the tube sheet. Thus, when the explosive charge is fired, the tube 49 is expanded into the enlarged portion 102 of the bore and is welded to the wall of the bore. At the same time, the portion of the tube 49 which extends above the face 91 of the tube sheet is sheared away, thereby leaving the tube in the condition shown at the right-hand portion of FIG. 9.

The construction and method of operation of the welding tool 10 are such that the adaptor 29 is held firmly against the face of the tube sheet during the welding operation. The reaction force cylinder 12 is moved by means of the handles 14 and 15 to compress the reaction force springs 17 with a force greater than the force developed by the recoil spring as it absorbs or stores the recoil energy of the explosive charge. The force of the springs 17 holds the adaptor 29 against the face of the tube sheet and the piston head 33 is biased against the face of the tube sheet by the spring 19. In order to fire the charge, the operator must fully compress the springs 17 by moving the cylinder 12 toward the tube sheet to permit the cam actuated switch 63 to close and he must hold the springs 17 compressed while actuating the trigger 71 to close the switch 68, thereby firing the charge.

In order to reduce the magnitude of the recoil energy and at the same time prevent a free exhaust of the explosive gases to the outside of the tool, which would be unsatisfactory to the operator, the piston 16 is made hollow, thereby forming the chamber 30, and the inner surface of the piston head 33 has a gradual contour, as shown at the reference numeral 103, to provide a diffusion passage and direct the explosive gases into the chamber 30 the volume of which increases toward the end opposite the head 33.

The explosive gases drive the piston 16 to compress the recoil spring 19 which absorbs the recoil energy. Thus, the initial expansion of the explosive gas occurs inside the piston which has a relatively large volume and as the piston is urged into compressing relation with the recoil spring 19, as shown in FIG. 7, surplus gas is exhausted through the ports 43. In this manner, the recoil energy, which varies inversely with volume changes, is reduced since the volume is increased in the present case. As previously explained, the reaction force springs 17 are compressed with a force greater than that developed by the recoil impulse to insure that the tool remains in the proper abutting position with the face of the tube sheet 48 during the welding operation.

From the foregoing description, it is apparent that the invention provides for the absorption of recoil energy in a manually held, explosive actuated tool where a recoil impulse is delivered to the tool. A satisfactory welding performance is obtained by insuring that the tool is held in the proper position during the welding operation. The tool is of a relatively simple construction and of a relatively light weight.

Since numerous changes may be made in the above-described construction and different embodiments of the invention may be made without departing from the spirit and scope thereof, it is intended that all subject matter contained in the fore going description or shown in the accompanying drawings shall be interpreted as illustrative and not in a limiting sense.

I claim as my invention:

1. A manually held explosive welding tool for welding a tube in a tube sheet by means of an explosive charge, said tool comprising:
    a piston sleeve,
    a cylinder slidably mounted on the sleeve,
    reaction force spring means,
    means for manually moving the cylinder to preload the spring means,
    a hollow piston slidably mounted inside the sleeve,
    a head on the piston for positioning the explosive charge in the tube to be welded in the tube sheet,
    means closing the end of the piston opposite the head,
    means for locating the head on said piston in coaxial alignment with the tube to be welded, and
    a recoil spring disposed inside the sleeve and engaging the closed end of the piston to bias the head against the face of the tube sheet.

2. The total defined in claim 1 wherein guide means are carried by the sleeve for insertion into tubes adjacent the tube being welded to position the tool on the tube sheet.

3. The tool defined in claim 1 wherein the piston head is contoured to permit explosion gases to expand into the hollow piston to compress the recoil spring.

4. The tool defined in claim 1 and further including switching means responsive to movement of the cylinder for controlling the firing of the explosive charge.

5. The tool defined in claim 4 and further including manually operable switching means cooperating with the first-named switching means in controlling the firing of the explosive charge.

6. The tool defined in claim 1 and further including latching means for releasably retaining the piston in the sleeve.

7. The tool defined in claim 1 wherein the piston head is removable from the piston.

8. The tool defined in claim 1 wherein the piston head has recesses therein for receiving the ends of tubes adjacent the tube being welded.

9. The tool defined in claim 1 wherein the means for manually moving the cylinder comprises two handles attached to the cylinder with switching means incorporated in each handle, and
    said switching means being connected in series-circuit relation and movable to the "on" position to initiate the firing of the explosive charge.

10. The tool defined in claim 1 and further including cam-actuated switching means operated by movement of the cylinder to a predetermined position for controlling the firing of the explosive charge.

11. The tool defined in claim 1 and further including cam-actuated switching means operated to the "on" position by movement of the cylinder to an extreme longitudinal position to initiate firing of the explosive charge.

12. The tool defined in claim 1 wherein the piston sleeve has a tubular end portion having a plurality of openings spaced around its wall for venting explosion gases upon retraction of the piston head.

13. The tool defined in claim 1 wherein the piston head has an annular array of recesses therein for receiving the ends of tubes adjacent the tube being welded, and
    the piston sleeve has an annular end portion with guide means thereon for insertion into other tubes adjacent the tube being welded to align the recesses in the piston head with said tubes.

14. The tool defined in claim 1 wherein the piston head has an annular array of recesses therein for receiving the ends of tubes adjacent the tube being welded,
    the piston sleeve has an annular flanged end portion with recesses therein for receiving the ends of other tubes adjacent the tube being welded, and
    guide means on the flanged end portion for insertion into still other tubes adjacent the tube being welded to align said recesses with said tubes.

References Cited

UNITED STATES PATENTS

| | | | |
|---|---|---|---|
| 2,030,803 | 2/1936 | Temple. | |
| 2,995,053 | 8/1961 | Freedom | 72—56 X |
| 3,031,007 | 4/1962 | Temple et al. | 72—56 X |
| 3,325,075 | 6/1967 | Higuchi et al. | 228—3 |

JOHN F. CAMPBELL, *Primary Examiner.*

PAUL M. COHEN, *Assistant Examiner.*